(12) United States Patent
Terada et al.

(10) Patent No.: US 9,024,190 B2
(45) Date of Patent: May 5, 2015

(54) WIRE CABLING DEVICE AND METHOD FOR MANUFACTURING THE SAME

(75) Inventors: Tomoyasu Terada, Shizuoka (JP); Tsukasa Sekino, Shizuoka (JP); Shinji Kato, Shizuoka (JP); Shougo Hasegawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 305 days.

(21) Appl. No.: 12/736,717

(22) PCT Filed: Feb. 10, 2009

(86) PCT No.: PCT/JP2009/052217
§ 371 (c)(1),
(2), (4) Date: Nov. 3, 2010

(87) PCT Pub. No.: WO2009/136511
PCT Pub. Date: Nov. 12, 2009

(65) Prior Publication Data
US 2011/0048761 A1  Mar. 3, 2011

(30) Foreign Application Priority Data

May 9, 2008  (JP) .................................. 2008-123599

(51) Int. Cl.
*H01B 7/00* (2006.01)
*H02G 3/04* (2006.01)
(Continued)

(52) U.S. Cl.
CPC ......... *B60R 16/0215* (2013.01); *Y10T 29/4984* (2015.01); *H02G 11/00* (2013.01); *B60N 2002/0264* (2013.01)

(58) Field of Classification Search
CPC ... H02G 11/00; H02G 11/006; H02G 3/0443; B60N 2/06; B60N 2002/0264; B65H 75/34; B60R 16/0215

USPC ............ 174/68.2–68.3, 72 A, 72 C; 361/826; 248/429; 296/155; 439/34
See application file for complete search history.

(56) References Cited

U.S. PATENT DOCUMENTS 5,785,292 A * 7/1998 Muraishi et al. .............. 248/429
6,494,523 B2 * 12/2002 Kobayashi .................... 296/155
(Continued)

FOREIGN PATENT DOCUMENTS

| CN | 101075732 A | 11/2007 |
|---|---|---|
| EP | 1479565 A1 | 11/2004 |

(Continued)

OTHER PUBLICATIONS

Japanese Office Action dated Jun. 26, 2012, issued for Japanese Application No. 2008-123599.
(Continued)

*Primary Examiner* — Adrian S Wilson
*Assistant Examiner* — Abhishek Rathod
(74) *Attorney, Agent, or Firm* — Locke Lord LLP; James E. Armstrong, IV; George N. Chaclas

(57) ABSTRACT

This object aims to provide a wire cabling device which a case can be shared among a plurality of devices for cabling electric wires to a plurality of sliders provided on the right and left sides of an automobile. A wire cabling device (1) comprises electric wires (50) for connecting an electronic apparatus mounted onto the floor (2) of an automobile with an electronic apparatus mounted to a seat (3), a case (5) for housing the intermediate portions of the wires (50), a slider capable of moving in linkage with the seat (3) on a rail installed in the case (5) while holding the wires (50), and a regulation member (90) which is provided in the case (5) and regulates the cabling route of the wires (50) in the case (5) by defining the case (5). The case (5) is so formed as to have a predetermined tubular cross-section along the sliding direction of the seat (3) by roll-molding, and the regulation member (90) is formed independently from the case (5).

13 Claims, 10 Drawing Sheets

(51) Int. Cl.
*B60R 16/02* (2006.01)
*H02G 11/00* (2006.01)
*B60N 2/02* (2006.01)

(56) References Cited

U.S. PATENT DOCUMENTS

| | | | |
|---|---|---|---|
| 6,575,760 B2* | 6/2003 | Doshita et al. | 439/34 |
| 7,238,029 B2* | 7/2007 | Tsubaki | 439/34 |
| 7,341,478 B2* | 3/2008 | Tsubaki et al. | 439/501 |
| 7,402,044 B2* | 7/2008 | Terada | 439/34 |
| 7,910,832 B2* | 3/2011 | Pieh et al. | 174/99 R |
| 2005/0035622 A1* | 2/2005 | Tsubaki et al. | 296/65.13 |
| 2005/0145409 A1* | 7/2005 | Terada | 174/58 |
| 2006/0021781 A1* | 2/2006 | Tsubaki et al. | 174/72 A |
| 2006/0060370 A1* | 3/2006 | Goto et al. | 174/68.1 |
| 2007/0087618 A1* | 4/2007 | Terada | 439/397 |
| 2007/0267211 A1* | 11/2007 | Yamamoto et al. | 174/68.1 |

FOREIGN PATENT DOCUMENTS

| | | |
|---|---|---|
| EP | 1736368 A1 | 12/2006 |
| EP | 1777098 A2 | 4/2007 |
| JP | 10-084619 A | 3/1998 |
| JP | 2006-035961 A | 2/2006 |
| JP | 2007-116780 A | 5/2007 |

OTHER PUBLICATIONS

International Search Report dated Mar. 24, 2009, issued for PCT/JP2009/052217.

European Search Report dated Apr. 11, 2012, issued for European Application No. 09742636.5.

Office Action issued Dec. 13, 2012 for Chinese Application No. 200980123618.4, with English translation.

* cited by examiner

WIRE CABLING DEVICE AND METHOD FOR MANUFACTURING THE SAME

TECHNICAL FIELD

This invention relates to a wire cabling device configured to cable a wire between a vehicle body and a sliding object slidably mounted on the vehicle body, and to a method for manufacturing the wire cabling device.

BACKGROUND ART

For example, a seat as a sliding object slidable relative to a floor of a cabin as a vehicle body may be mounted on a vehicle. An electronic device such as a seating sensor for detecting whether a crew member is seated or not may be attached to the seat. For this reason, various wire cabling devices for cabling a wire between the floor and the seat are used in the vehicle in order to connect the electronic device attached to the seat to the electronic device fixed to the floor (for example, see Patent Document 1).

FIG. 8 is a perspective view showing a conventional wire cabling device. FIG. 9 is an exploded view of the wire cabling device shown in FIG. 8. FIG. 10 is a sectional view taken on line E-E of FIG. 8. FIG. 11 is an explanatory view for explaining a mounting condition of a pair of conventional wire cabling devices mounted on a vehicle body.

A conventional wire cabling device 201 shown in FIGS. 8 to 10 is a device configured to cable an electric wire 250 between a floor 202 of a cabin of a vehicle as a vehicle body, and a seat 203 as a sliding object slidably arranged along an arrow K2 on the floor 202. This wire cabling device 201 includes: the electric wire 250 for connecting the electronic device attached to the floor 202 to the electronic device attached to the seat 203; a case 205 receiving the electric wire 250; a rail 211 formed on an inside of the case 205; a first protector 206 and a second protector 230 for moving in linkage with the seat 203 on a rail 211.

The case 205 is formed by a lower case 209 and an upper case 210 overlapped with each other, and has a tubular shape. The lower case 209 and the upper case 210 are made of a thick metal plate. The case 205 is fixed to the floor 202 with such as a bolt 212, while a bottom wall 209a (see FIG. 10) abuts on the floor 202. A regulation part 290 is integrally formed with the lower case 209 by embossing a part of the bottom wall 209a toward the upper case 210. This regulation part 290 regulates a cabling route of the electric wire 250 in the case 205 into a U-shape by partitioning a space in the case 205. A slit 225 extended along the arrow K2 for guiding the first protector 206 from an inside of the case 205 to an outside of the case 205 is formed on the case 205 (see FIG. 10). Further, a mall 207 is attached around the slit 225 for preventing a foreign particle from entering the case 205 via the slit 225.

Because the case 205 is disposed under the seat 203, and as shown in FIG. 10, hidden under a mat 228, the crew member of the vehicle often stamps the case in an arrow F2 direction toward the floor 202. Therefore, for preventing the case 205 from being deformed or damaged when the case 205 is stamped, the rigidity of the case 205 is improved by thickening a thickness of the case 205, by arranging concave portions 243 and convex portions 242 alternately along the arrow K2 on a ceiling wall of the upper case 210 in a bead shape, or by bolting a plurality of positions of the case 205 to the floor 202.

A middle part of the electric wire 250 is received in the case 205, and arranged in a U-shape by the regulation part 290. An end of the electric wire 250 near the seat 203 is held by the first protector 206. The electric wire 250 is guided from the case 205 via the slit 225 to an outside of the case 205, namely, to the seat 203 side. Further, the other end of the electric wire 250 at the floor 202 side is guided from an end 205a of the case 205 to the outside of the case 205.

Further, a reference sign 204 in FIG. 9 indicates a corrugate tube for protecting the electric wire 250. Further, the second protector 230 is attached to the seat 203, and coupled to the first protector 206 with a cord.

As shown in FIG. 11, such a wire cabling device 201 is attached to the floor 202, and arranges the electric wire 250 to a front passenger's seat 203 of a vehicle. In the wire cabling device 201' arranging the electric wire 250 to a driver's seat 203, the case 205 is designed to have a line symmetric shape along a width direction H2 of the wire cabling device 201 and the vehicle.

CITATION LIST

Patent Literature

Patent Document 1: JP, A, 2006-35961

SUMMARY OF INVENTION

Technical Problem

Although the cases 205 of the wire cabling device 201 and the wire cabling device 201' include the regulation part 290 integrally formed with the lower case 209 and the bead shape composed of the concave portions 243 and convex portions 242, and have the symmetric shape along the width direction H2 of the vehicle, the case 205 having the same shape cannot be commonly used in the wire cabling device 201 and the wire cabling device 201' because a sectional shape of the case 205 along the sliding direction of the seat 203 is not constant. Namely, the case 205 of the wire cabling device 201 cannot be used as the case 205 of the wire cabling device 201' by rotating the case 205 180 degree. Therefore, two types of dedicated metal molds are needed for the case 205 of the wire cabling device 201 and the case 205 of the wire cabling device 201', and there is a problem that a production cost increases.

Further, as described above, because the sectional shape of the case 205 along the sliding direction of the seat 203 is not constant in the wire cabling device 201 and the wire cabling device 201', there is a problem that these cases 205 cannot be made by roll forming or extrusion molding having high productivity, and must be made by press molding of which production cost is high.

Accordingly, an object of the present invention is to provide a wire cabling device which a case can be shared among a plurality of cable wiring devices for cabling electric wires to a plurality of sliders provided on the right and left sides of a vehicle, and to provide a method for manufacturing the wire cabling device.

Solution to Problem

For attaining the object, according to the invention described in claim 1, there is provided a wire cabling device comprising:

a case configured to receive a middle part of an electric wire arranged between a vehicle body and a sliding object slidably mounted on the vehicle body, and configured to be attached to the vehicle body, a slider capable of moving in linkage with the sliding object on a rail attached to the case while holding the electric wire, a regulation member which is provided in the case and regulates a cabling route of the electric wire in the case by partitioning the case, wherein the case is formed in a tubular shape having a constant sectional shape along a sliding direction of the sliding object, and wherein the regulation member is formed independently from the case.

According to the invention described in claim 2, there is provided the wire cabling device as claimed in claim 1, wherein regulation member attaching parts capable of attaching the regulation member are provided on two places, one end and the other end of the case in the sliding direction.

According to the invention described in claim 3, there is provided the wire cabling device as claimed in claim 1 or 2, wherein the regulation member is formed in a plane-symmetrical shape relative to a virtual plane passing the center of the regulation member and perpendicular to the sliding direction.

According to the invention described in claim 4, there is provided the wire cabling device as claimed in any one of claims 1 to 3, wherein the case includes: a bottom wall having a gap with the vehicle body; and a ceiling wall facing the bottom wall, and wherein the case further includes a pair of caps respectively attached to both ends of the case, said caps having a ceiling wall abutting part abutting on an inner surface at the bottom wall side of the ceiling wall, and a vehicle body abutting part abutting on the vehicle body.

According to the invention described in claim 5, there is provided a method for manufacturing a wire cabling device including: a case for receiving an electric wire; a slider capable of moving on a rail attached to the case while holding the electric wire; and a regulation member for regulating a cabling route of the electric wire in the case by partitioning the case, said method comprising the steps of forming the case in a tubular shape having a constant sectional shape along a sliding direction of the slider;

producing the regulating member independent from the case; and attaching the regulation member to the case at an attaching position properly changeable along the sliding direction.

Advantageous Effects of Invention

According to the invention claimed in claim 1, because the regulation member is formed independently from the case, the shape of the case can be a tubular shape having a constant sectional shape along the sliding direction of the sliding object. Therefore, in a plurality of wire cabling devices respectively cabling electric wires to a plurality of sliding objects provided on the right and left sides of a vehicle, the case at the right side of the wire cabling device can be rotated 180 degree to be used as the case at the left side of the wire cabling device. Further, these cases can be made by roll forming or extrusion molding having high productivity. Resultingly, a cost of the wire cabling device can be reduced, and a production cost of the case can be reduced.

According to the invention claimed in claim 2, because regulation member attaching parts capable of attaching the regulation member are provided on two places, one end and the other end of the case in the sliding direction, in a plurality of wire cabling devices respectively cabling electric wires to a plurality of sliding objects provided on the right and left sides of a vehicle, it is unnecessary to respectively provide the regulation member attaching parts to the cases independently. Therefore, the production cost of the case can be further reduced.

According to the invention claimed in claim 3, because the regulation member is formed in a plane-symmetrical shape relative to a virtual plane passing the center of the regulation member and perpendicular to the sliding direction, in a plurality of wire cabling devices respectively cabling electric wires to a plurality of sliding objects provided on the right and left sides of a vehicle, not only the case but also the regulation member can be commonly used. Therefore, the cost of the wire cabling device can be further reduced.

According to the invention claimed in claim 4, because the case includes: a bottom wall having a gap with the vehicle body; and a ceiling wall facing the bottom wall, and the case further includes a pair of caps respectively attached to both ends of the case, and the caps have a ceiling wall abutting part abutting on an inner surface at the bottom wall side of the ceiling wall, and a vehicle body abutting part abutting on the vehicle body, when a load is applied to the case from the ceiling wall to the bottom wall by such as stamping the case, the caps work as supports, and the load is not applied to the bottom wall, and transmitted to the vehicle body via the caps, thereby the stress generated in the case is reduced. Therefore, the rigidity capable of sufficiently enduring the load can be attained using the case and the pair of caps made by a process having high productivity such as roll forming or extrusion molding without providing a bead shape (namely, convexes and concaves made by press working) for increasing the rigidity which is provided in a conventional case by press working. Further, because a thickness of the case can be reduced, the case can be lighter, and a material cost can be reduced. Further, because the number of bolting positions for preventing the case from being deformed by the load can be further reduced than the conventional case, design flexibility of the case is increased, and man-hours for bolting the case can be reduced. Further, when convexes and concaves of which shapes depend on a car type are formed on a surface of the vehicle body to which the case is attached, because the case is disposed with a gap from the vehicle body, it is unnecessary to design the bottom wall in order to fit the convexes and the concaves, and only the vehicle body abutting part is designed in order to fit the concaves and the convexes. Therefore, the case can be commonly used in different car types.

According to the invention claimed in claim 5, there is provided a method for manufacturing a wire cabling device including: a case for receiving an electric wire; a slider capable of moving on a rail attached to the case while holding the electric wire; and a regulation member for regulating a cabling route of the electric wire in the case by partitioning the case, said method comprising the steps of forming the case in a tubular shape having a constant sectional shape along a sliding direction of the slider; producing the regulating member independent from the case; and attaching the regulation member to the case at an attaching position properly changeable along the sliding direction. Therefore, in a plurality of wire cabling devices respectively cabling electric wires to a plurality of sliding objects provided on the right and left sides of a vehicle, the case at the right side of the wire cabling device can be rotated 180 degree to be used as the case at the left side of the wire cabling device.

Figure 1:
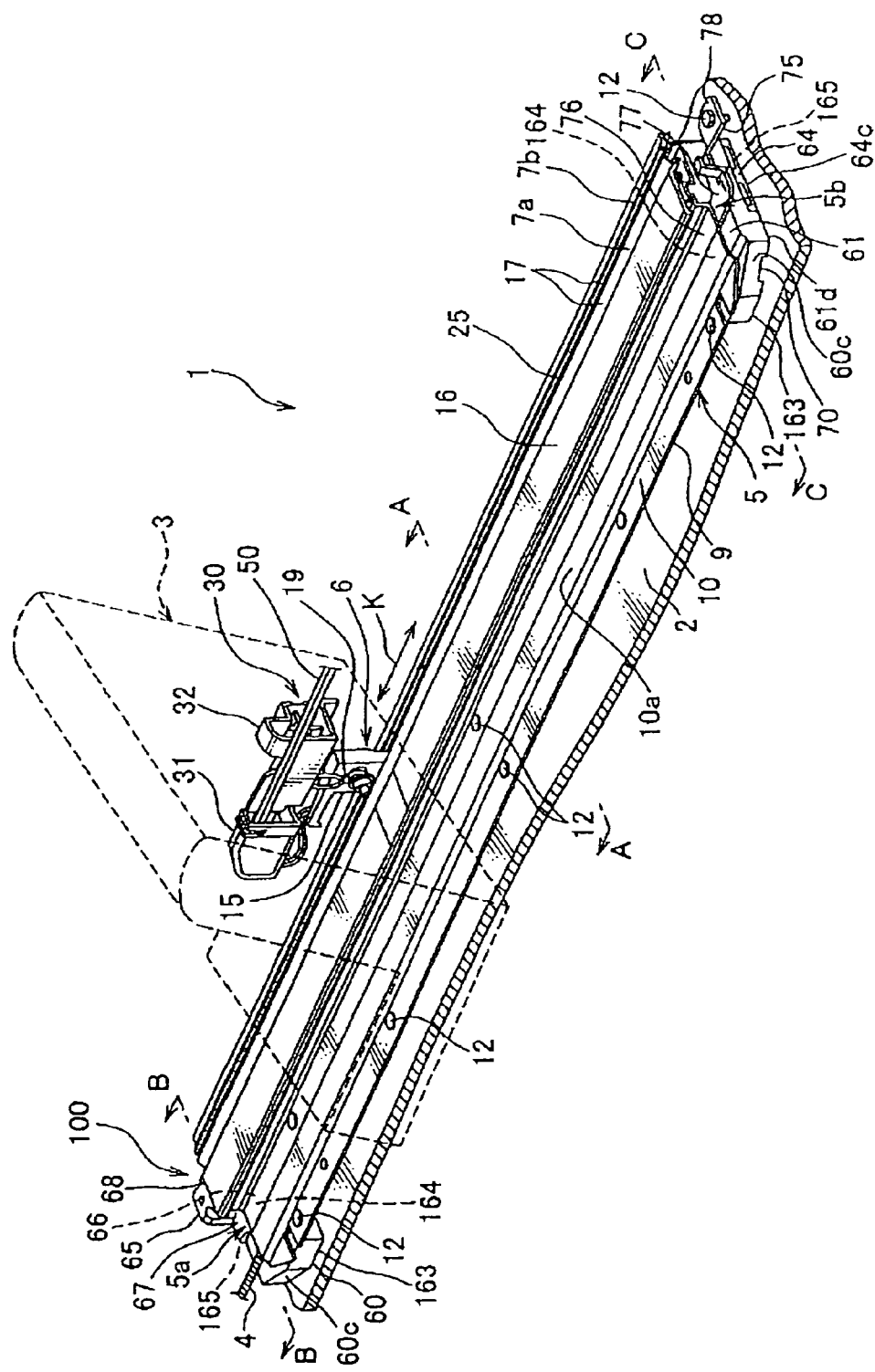
FIG. 1 A perspective view showing a wire cabling device according to an embodiment of the present invention.

REFERENCE SIGNS LIST 1, 1' wire cabling device
2 floor (vehicle body)
3 seat (sliding object)
5 case
5a one end
5b the other end
6, 6' first protector (slider)
9a bottom wall
10a ceiling wall
11 rail
50 electric wire
51, 52 regulation member attaching part
60, 60', 70, 70' cap
61d, 64c, 163 vehicle body abutting part
90 regulation member
164 ceiling wall abutting part

DESCRIPTION OF EMBODIMENTS

Figure 2:
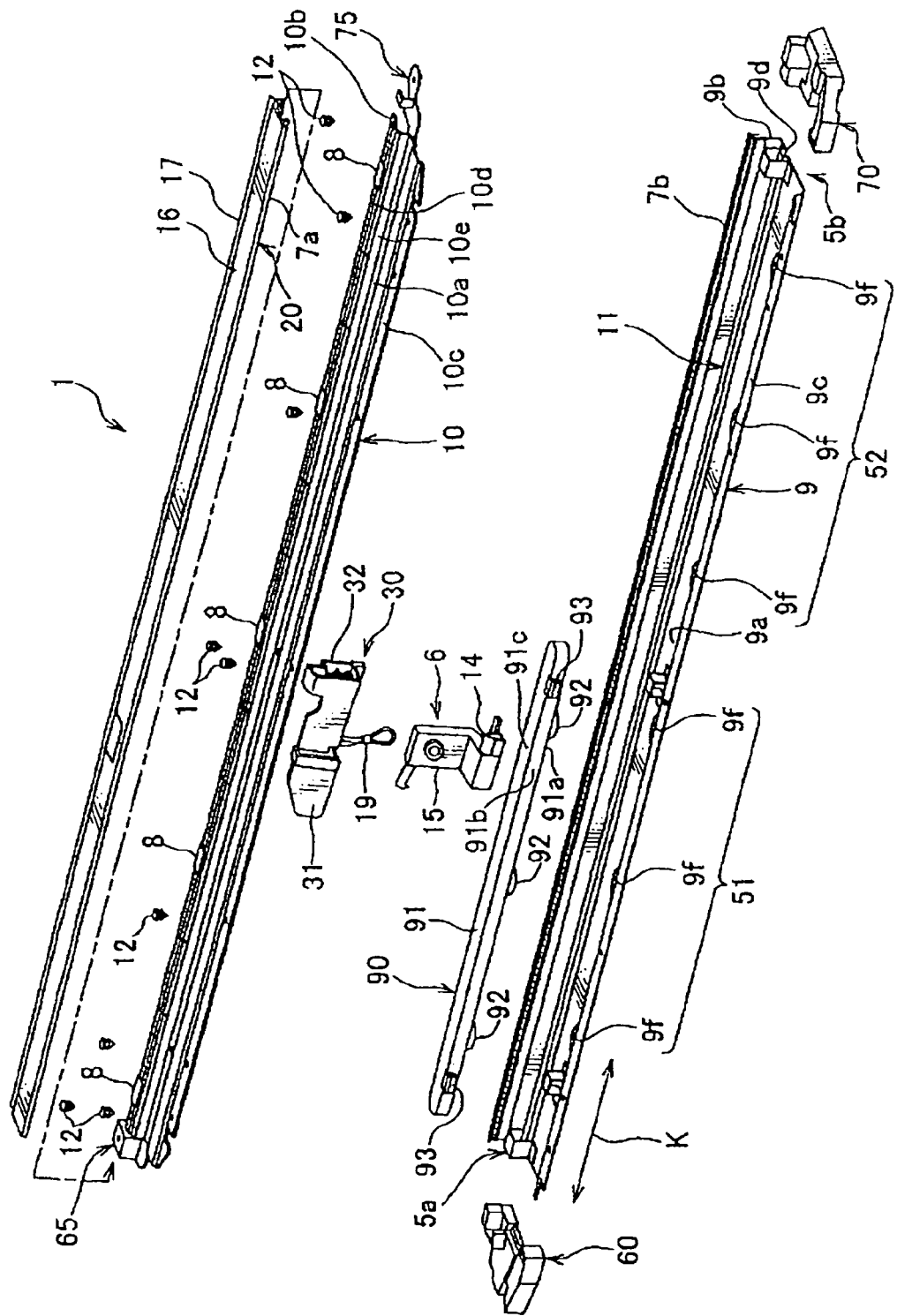
FIG. 2 An exploded view of the wire cabling device shown in FIG. 1.
Figure 3:
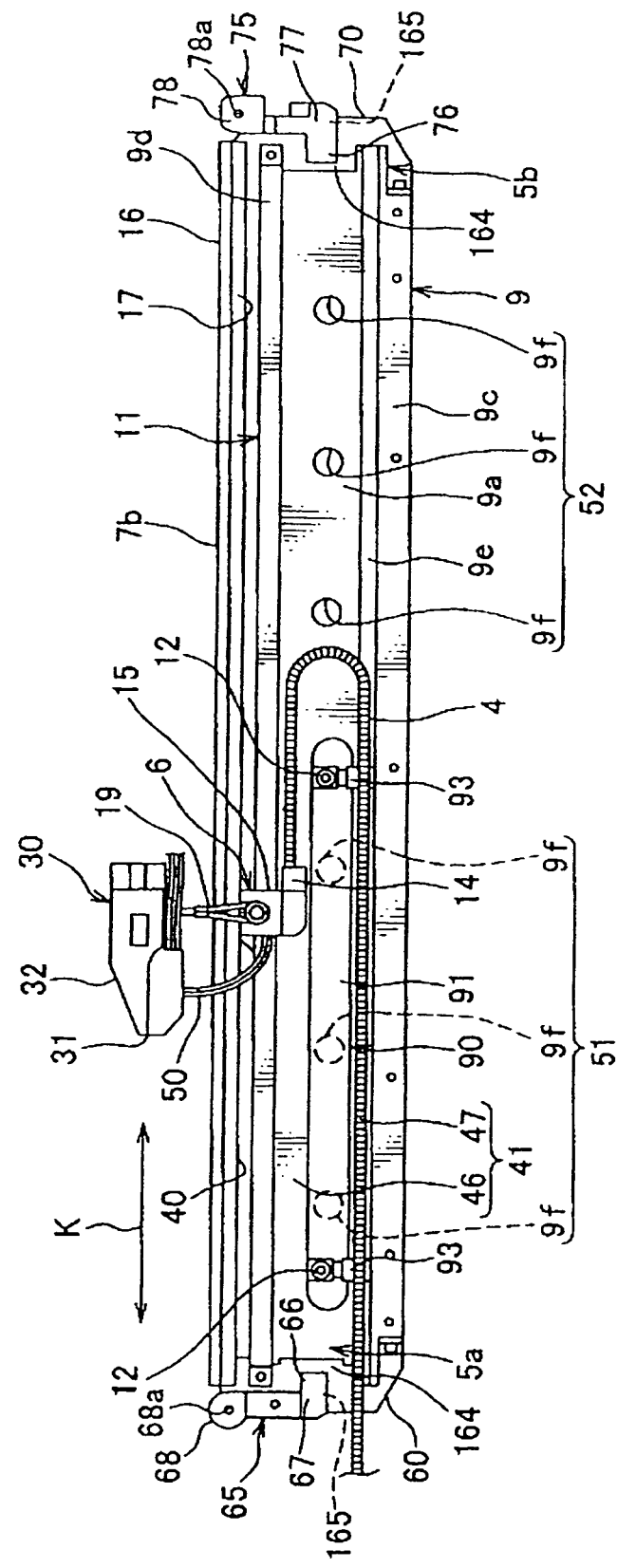
FIG. 3 A plan view showing the wire cabling device shown in FIG. 1, of which an upper case is removed.
Figure 4:
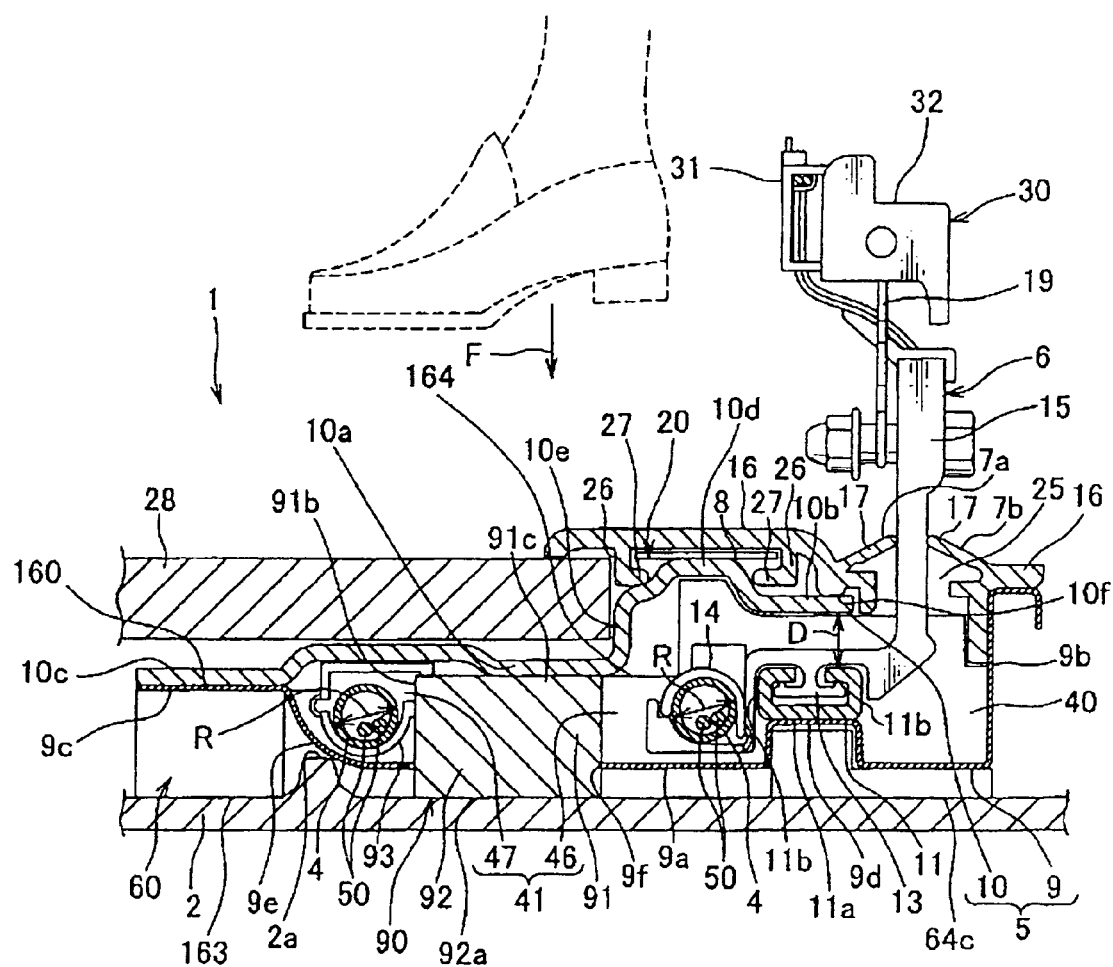
FIG. 4 A sectional view taken on line A-A of FIG. 1.
Figure 5:
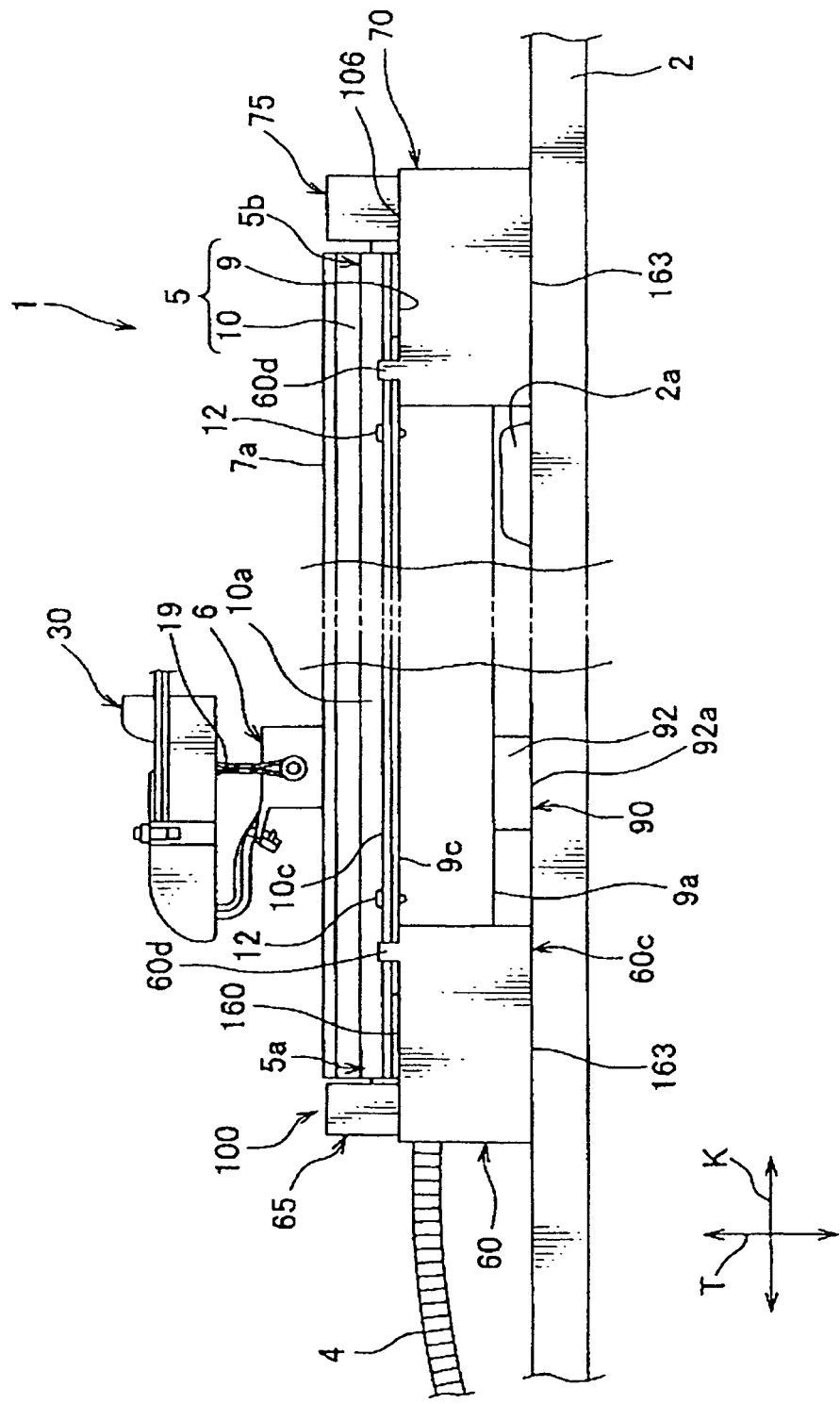
FIG. 5 A plan view showing the wire cabling device shown in FIG. 1.
Figure 6:
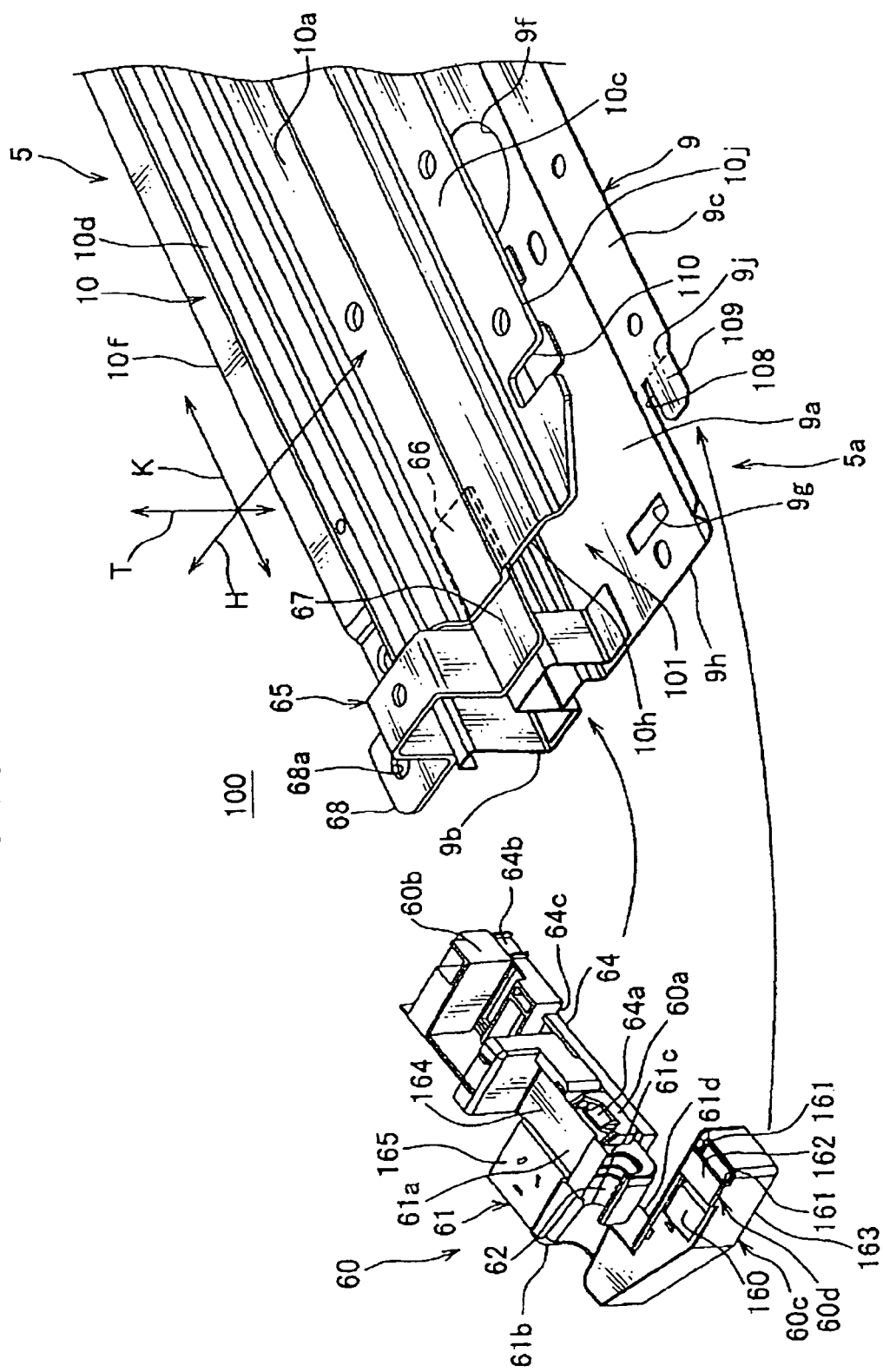
FIG. 6 An exploded view showing a cap and a case composing the wire cabling device shown in FIG. 1.
Figure 7:
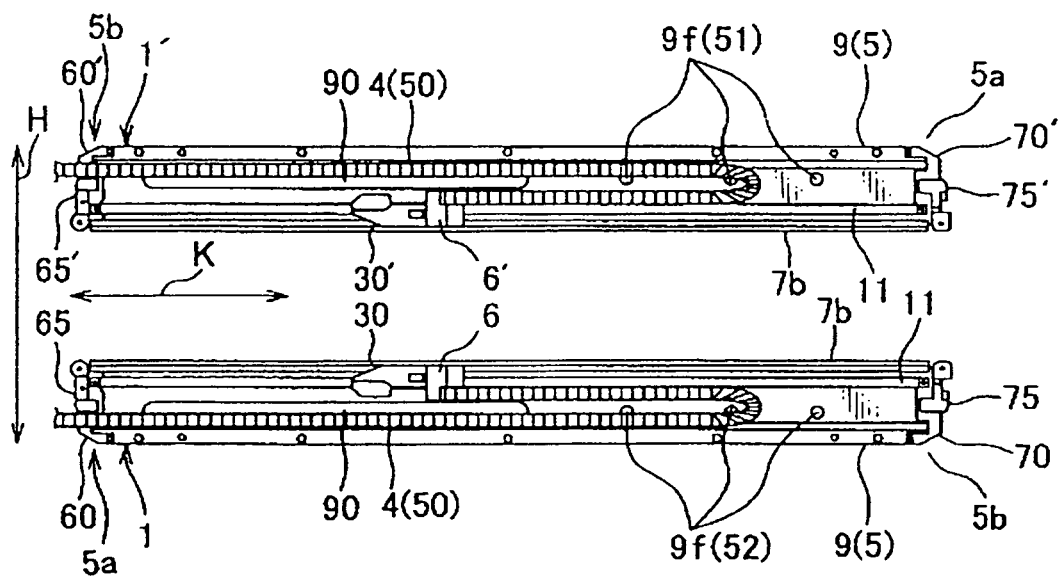
FIG. 7 An explanatory view for explaining a mounting condition of a pair of wire cabling devices of the present invention on a vehicle body.
Figure 8:
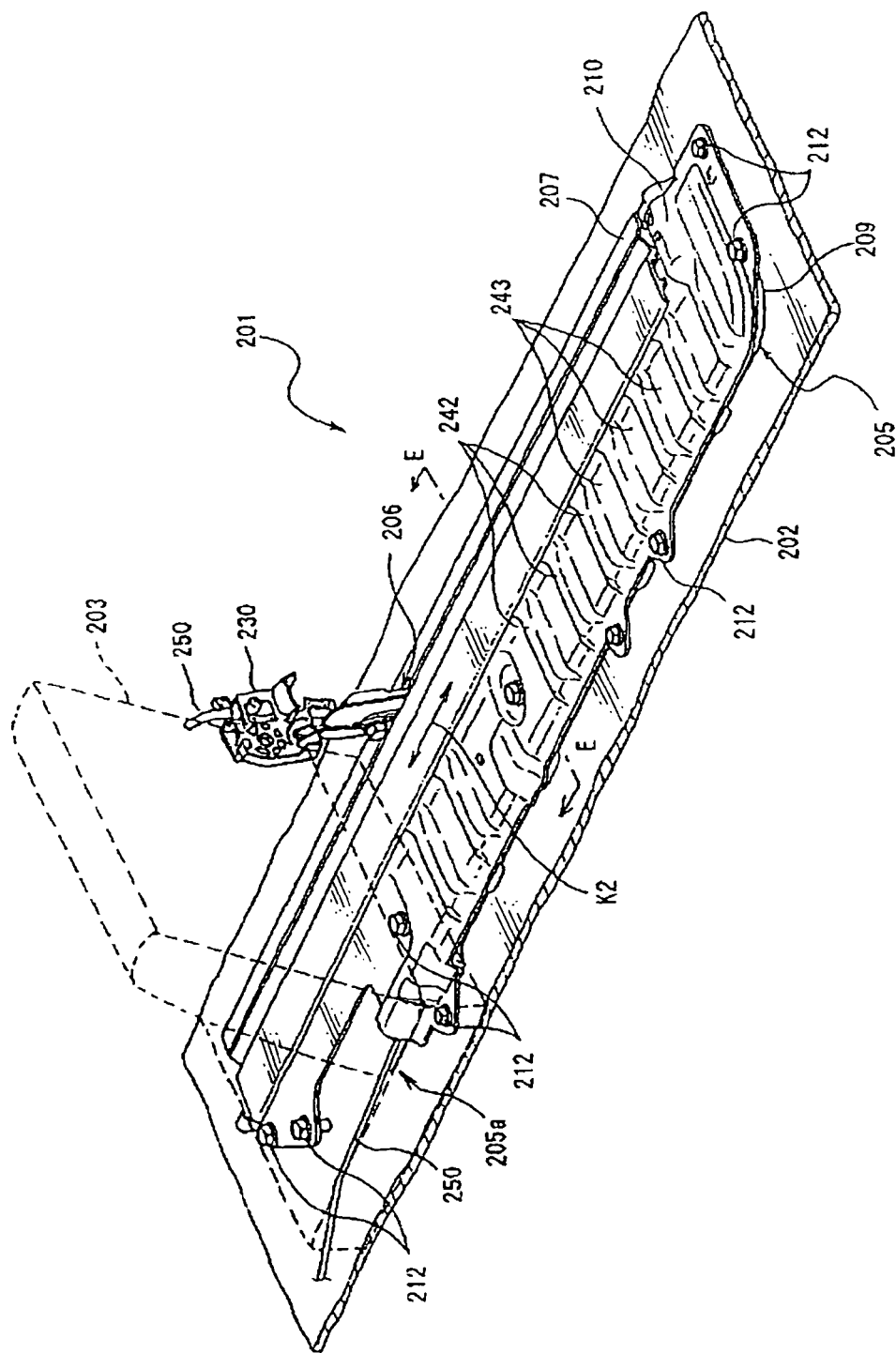
FIG. 8 A perspective view showing a conventional wire cabling device.
Figure 9:
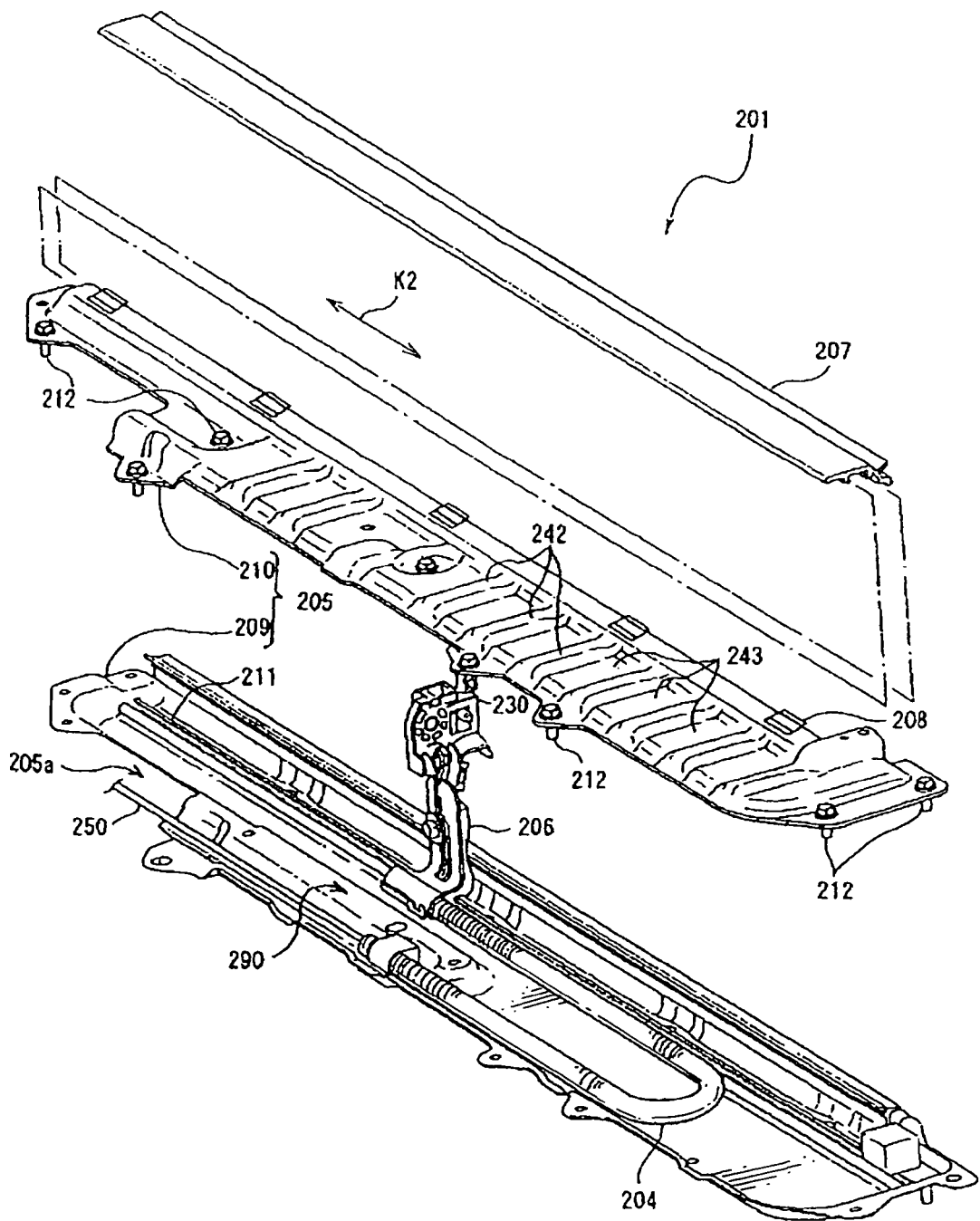
FIG. 9 An exploded view showing the wire cabling device shown in FIG. 8.
Figure 10:
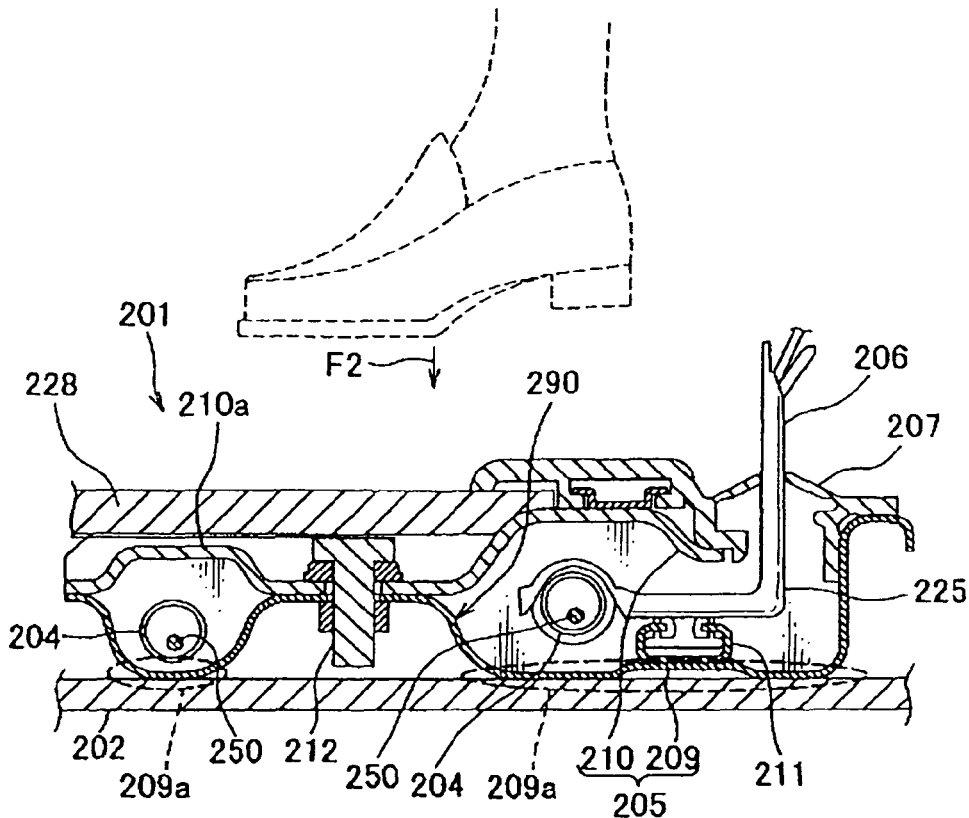
FIG. 10 A sectional view taken on line E-E of FIG. 8.
Figure 11:
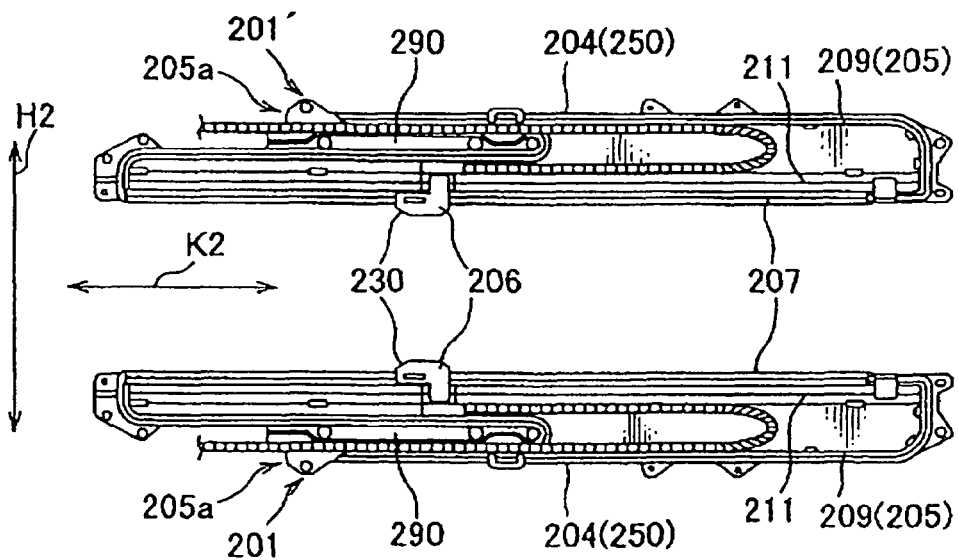
FIG. 11 An explanatory view for explaining a mounting condition of a pair of conventional wire cabling devices on a vehicle body.

Hereinafter, a wire cabling device according to an embodiment of the present invention will be explained with reference to FIGS. 1 to 7. FIG. 1 is a perspective view showing a wire cabling device according to the embodiment of the present invention. FIG. 2 is an exploded view of the wire cabling device shown in FIG. 1. FIG. 3 is a plan view showing the wire cabling device shown in FIG. 1, of which an upper case is removed. FIG. 4 is a sectional view taken on line A-A of FIG. 1. FIG. 5 is a plan view showing the wire cabling device shown in FIG. 1. FIG. 6 is an exploded view showing a cap and a case composing the wire cabling device shown in FIG. 1. FIG. 7 is an explanatory view for explaining a mounting condition of a pair of wire cabling devices of the present invention on a vehicle body.

As shown in FIGS. 1 to 5, a wire cabling device 1 of the present invention cabling an electric wire 50 between a floor 2 of a cabin of a vehicle and a seat 3 as a sliding object slidably mounted on the floor 2 along an arrow K direction. Further, the arrow K extends straight in a longitudinal direction of the vehicle.

Electronic devices such as a seating sensor for detecting whether a crew member is seated or not, a seat belt sensor for detecting whether a seated crew member fastens a seat belt or not, or the like are mounted on the seat 3.

The wire cabling device 1 includes: a plurality of electric wires 50; a container 100 for receiving a middle part of the electric wires 50; a pair of brackets 65, 75 respectively attached to an one end 5a and the other end 5b of a case 5 of the container 100 for fixing the case 5 to the floor 2; a regulation member 90 provided in the case 5; a rail 11 provided in the case 5; a plurality of mall brackets 8 attached to the case 5; a pair of malls 7a, 7b attached to the case 5; a first protector 6 and a second protector 30 as a slider capable of moving in linkage with the seat 3 on the rail 11.

Each electric wire 50 is a so-called covered electric wire having a conductive core wire and an insulating cover. These electric wires 50 connect the above-described electronic devices attached to the seat 3 to the electronic devices such as an ECU (Electronic Control Unit) attached to the floor 2. Further, these electric wires 50 are bundled and inserted into a corrugate tube 4 (see FIG. 3). The corrugate tube 4 is made of synthetic resin such as polypropylene, and formed in a bellows tube shape. The corrugate tube 4 protects the electric wires 50 by receiving the electric wires 50 therein.

As shown in FIGS. 1 and 2, the container 100 includes: a tubular case 5 of which one end 5a in the longitudinal direction the electric wires 50 are guided out from; a cap 60 attached to the one end 5a of the case 5; and a cap 70 attached to the other end 5b of the case 5. Further, the case 5 includes: a lower case 9; and an upper case 10 fixed to the lower case 9 with a bolt or the like while overlapped with the lower case 9.

The lower case 9 is made of a metal plate, and formed in a rectangular shape in a plan view, of which longitudinal direction is parallel to the arrow K. Namely, a width direction of the lower case 9 is parallel to a width direction H (see FIGS. 6 and 7) of the vehicle. As shown in FIGS. 4 and 5, this lower case 9 includes: a plate-shaped bottom wall 9a disposed on the floor 2 with a gap; an inner edge wall 9b vertically extending from an edge of the bottom wall 9a positioned inside (right side in FIG. 4) of the cabin, and forming a slit 25 between the rail 11 and a later-described inner edge 10f of the upper case 10; a second outer edge wall 9e vertically extending from an edge of the bottom wall 9a positioned at an outside (left side in FIG. 4) of the cabin; an outer edge 9c continued from a top end of the second outer edge wall 9e away from the bottom wall 9a, and extending in a plate shape toward an outside of the cabin; and a rail attaching part 9d disposed on the bottom wall 9a at an inner side of the cabin, and with which a bottom plate 11a of the rail 11 is overlapped and the rail 11 is attached. Further, longitudinal directions of the bottom wall 9a, the inner edge wall 9b, the second outer edge wall 9e, the outer edge 9c and the rail attaching part 9d are parallel to the arrow K.

The slit 25 is a gap communicating an inside with an outside of the case 5, and extended straight in longitudinal directions of the case 5 and the rail 11, namely, along the arrow K. The slit 25 is a gap for guiding a later-described wire receiving part 15 of the first protector 6 from the inside of the case 5 to the outside of the case 5, namely, the seat 3.

The second outer edge wall 9e is formed in a curved wall gradually approaching the seat 3 as away from the bottom wall 9a. A surface of the outer edge 9c is parallel to a surface of the bottom wall 9a, and overlapped with a later-described outer edge 10c of the upper case 10. The rail attaching part 9d is projected further toward the seat 3 than the other portions of the bottom wall 9a, and extended straight along longitudinal directions of the rail 11 and the lower case 9. Further, a surface of the rail attaching part 9d is formed flat.

Further, as shown in FIG. 3, a plurality of through-holes 9f penetrating the bottom wall 9a and each having a circular shape in a plan view are formed with gaps along the longitudinal direction of the bottom wall 9a. Later-described cylinder parts 92 of the regulation member 90 are inserted into the through-holes 9f. Further, in this embodiment, six through-holes 9f are formed. One regulation member attaching part 51 is composed of three through-holes 9f positioned at the one end 5a side of the case 5. The other regulation member attaching part 52 is composed of three through-holes 9f positioned at the other end 5b side of the case 5.

The upper case 10 is made of a metal plate, and formed in a rectangular shape in a plan view, of which longitudinal direction is parallel to the arrow K. Namely, a width direction of the upper case 10 is parallel to the width direction H of the vehicle. This upper case 10 includes: a plate-shaped ceiling wall 10a arranged parallel to the bottom wall 9a with a gap, namely, facing the bottom wall 9a; a standing wall 10e extended vertically from an edge of the ceiling wall 10a positioned at the cabin side; an upper wall 10b continued from a top end of the standing wall 10e away from the ceiling wall 10a, and extending in a plate shape toward an inside of the cabin; an outer edge 10c disposed outside of the cabin and overlapped with the outer edge 9c; and a mall attaching part 10d mounted on the upper wall 10b, overlapped with a later-described mall bracket 8, and to which the mall bracket is attached. Further, longitudinal directions of the 10a ceiling wall 10a, the standing wall 10e, the upper wall 10b, the outer edge 10c and the mall attaching part 10d are parallel to the arrow K.

The ceiling wall 10a faces the bottom wall 9a at a position where the through-holes 9f are formed. The standing wall 10e is disposed at substantially the center of the case 5 in the width direction. The top end of the standing wall 10e is as high as a top end of the inner edge wall 9b of the lower case 9. The word "high" means a position along a direction T (see FIG. 6) from the floor 2 to the seat 3. Further, the inner edge 10f of the upper wall 10b at the inside of the cabin is separated from the inner edge wall 9b of the lower case 9 with a gap. The outer edge 10c is formed flat, and its planar direction is parallel to a planar direction of the ceiling wall 10a. The mall attaching part 10d is further projected toward the seat 3 than the other parts of the upper wall 10b, and extended straight along the longitudinal direction of the upper case 10. Further, a surface of the mall attaching part 10d is formed flat.

The upper case 10 and the lower case 9 are assembled with each other and compose a tubular case by fixing the outer edge 9c and the outer edge 10c overlapped with each other with a bolt 12 or the like. Further, as shown in FIG. 1, in the case 5, the bottom wall 9a is attached to the floor 2 with a gap by fixing a pair of brackets 65, 75 attached to both ends 5a, 5b in the longitudinal direction of the case 5 with the bolt 12 or the like. Further, while the lower case 9 and the upper case 10 are assembled with each other, the longitudinal directions of the lower case 9, the upper case 10, and the rail 11 are parallel to each other, and parallel to the arrow K.

Further, the upper case 10 and the lower case 9 are respectively formed by well-known roll forming, extrusion molding, or the like to provide an elongated structure having a constant sectional shape along a sliding direction of the seat 3, namely, a sliding direction of the first protector 6, by cutting the elongated structure in a specific length, and by punching a hole for inserting the bolt 12. Incidentally, the roll forming is a processing method that a band-shaped metal plate sequentially passes through the forming rolls to be deformed along the surface shape of the forming rolls and to be formed in a various shape such as a cylinder shape, a rectangular tubular shape, or the like.

Further, in this specification, a space nearer the slit 25 than the rail attaching part 9d in an inner space of the case 5 is referred to as a wire moving space 40, and a space further away from the slit 25 than the rail attaching part 9d is referred to as a wire receiving space 41. The case 5 allows the electric wire 50 to move in linkage with the seat integrally with the first protector 6. The electric wire 50 covered by the corrugate tube 4 is received in the wire receiving space 41.

The cap 60 is made of synthetic resin, and as shown in FIG. 6, includes: an inserting part 61 of which a top end part 61c is inserted into an opening 101 disposed at the one end 5a of the case 5, and of which a rear end part 61b is positioned at an outside of the opening 101, namely, an outside of the one end 5a along the arrow K; a plate part 64 connected to the rear end part 61b of the inserting part 61 via a hinge, and holds the lower case 9 with the top end part 61c; and a coupling part 60c continued to the inserting part 61, and attached to an outer edge 9c of the lower case 9 by overlapping with a surface of the outer edge 9c at the bottom wall 9a side.

The inserting part 61 includes: an upper wall 61a; and a bottom wall 61d facing the upper wall 61a, and positioned on the floor 2 to abut on the floor 2 while the case 5 is fixed to the floor 2. A portion of the upper wall 61a abutting on an inner surface of the ceiling wall 10a of the upper case 10 at the bottom wall 9a side while the top end part 61c is inserted into the opening 101 is referred to as a "ceiling wall abutting part 164". Further, a portion of the upper wall 61a positioned at the outside of the opening 101, and overlapped with the bracket 65 while the top end part 61c is inserted into the opening 101 is referred to as "a bracket abutting part 165".

Further, a groove 62 concaved to the bottom wall 61d side, namely, the floor 2 side from the upper wall 61a and extended from the top end part 61c to the rear end part 61b is formed on the inserting part 61 of the cap 60. The corrugate tube 4 receiving the electric wire 50 is positioned to an inside of this groove 62, and the corrugate tube 4, namely, the electric wire 50 received in the case 5 is guided out to an outside of the case 5 via the groove 62. Further, the electric wire 50 guided out to an outside of the case is connected to the electronic device such as ECU attached to the floor 2 side.

The plate part 64 includes a pair of rocking claws 64a, 64b extending vertically from an edge at the top end part 61c side toward the upper wall 61a. These rocking claws are arranged with a gap in a width direction H perpendicular to the arrow K. These rocking claws are respectively engaged with a pair of rocking receivers 60a, 60b disposed at the top end part 61c with a gap while the rocking claws are inserted into a pair of attaching holes 9g (only one hole is shown in FIG. 6) disposed on the bottom wall 9a of the lower case 9 with a gap. Further, the plate part 64 abuts on the floor 2 by positioning a bottom wall 64c disposed at a side away from the upper wall 61a on the floor 2 while the case 5 is fixed to the floor 2.

The coupling part 60c includes an enclosure part 60d formed in a rectangular tubular shape and having an upper wall 160 overlapped with the outer edge 9c of the lower case 9, a pair of plate parts 161 arranged in the width direction H from the upper wall 160 with a gap and projected in a plate shape, and a connecting part 162 connecting ends of the pair of plate parts 161 away from the upper wall 160 side together. When the cap 60 is attached to the one end 5a, an attaching piece 109 of the lower case 9 is received in an inside of the enclosure part 60d, and an inner surface of the enclosure part 60d closely contacts an outer surface of the attaching piece 109, thereby the enclosure part 60d is attached to the outer edge 9c. The attaching piece 109 is a portion extended in a plate shape to the outside of the lower case 9 along the arrow K from an end 9j (indicated by two-dot chain line in FIG. 6) of the outer edge 9c along the arrow K. Further, the enclosure part 60d attached to the outer edge 9c is positioned in a notch part 110 of the outer edge 10c of the upper case 10. The notch part 110 is a partially notched portion of the outer edge 10c extending from an edge part 10j of the outer edge 10c positioned at an outside of the cabin toward the inner edge 10f. Further, the coupling part 60c abuts on the floor 2 by positioning a bottom wall 163 disposed away from the upper wall 160 on the floor 2 while the case 5 is fixed to the floor 2.

The above-described bottom wall 61d, the bottom wall 64c, and the bottom wall 163 are the "vehicle body abutting part" in claims.

The cap 70 is made of synthetic resin, and has the same structure as the above-described cap 60 except that the groove 62 is not formed. The caps 60, 70 prevent a foreign particle from entering the case 5, and prevent the electric wire 50 from falling out of the case 5 by attaching to the ends 5a, 5b of the case 5.

The pair of brackets 65, 75 is made by pressing a metal plate, and respectively includes: one ends 66, 76 attached to an inner surface of the ceiling wall 10a of the upper case 10 at the bottom wall 9a side by welding or the like; the other ends 68, 78 attached to the floor 2; and middle parts 67, 77 interposed between the one ends 66, 76 and the other ends 68, 78. The other ends 68, 78 include flat parts to be overlapped with the surface of the floor 2, and have holes 68a, 78a for inserting the bolts 12. Further, the middle parts 67, 77 are overlapped with the bracket abutting parts 165 of the caps 60, 70. Therefore, when the load is applied to the brackets 65, 75, the bracket abutting parts 165 support the brackets 65, 75 to prevent the brackets 65, 75 from being deformed. Incidentally, the brackets 65, 75 are shown in FIG. 3, however, in reality, the one ends 66, 76 are previously attached to the upper case 10.

As shown in FIG. 3, the regulation member 90 is extended from the one end 5a of the case 5 to the center in the longitudinal direction of the case 5. This regulation member 90 is made of synthetic resin or the like, and formed independently from the case 5. Further, the regulation member 90 includes: a rectangular cylinder part 91 of which longitudinal direction is parallel to the arrow K; a plurality of circular cylinder parts 92 projected from a bottom wall 91a of the rectangular cylinder part 91; and a plurality of wire fixing parts 93 disposed at a side wall 91b of the rectangular cylinder part 91, and fixing the corrugate tube 4 by wrapping around an outer periphery of the corrugate tube 4. Further, in this embodiment, three circular cylinder parts 92 are provided, and two wire fixing parts 93 are provided. A height of the rectangular cylinder 91 is the same as a distance between the bottom wall 9a and the upper wall 10b of the case 5. Incidentally, the "height" means a size from the bottom wall 91a from which the circular cylinder part 92 is projected to the upper wall 91c facing the bottom wall 91a. The circular cylinder parts 92 are arranged in a longitudinal direction of the rectangular cylinder part 91 with gaps between them. A diameter of each circular cylinder part 92 is slightly smaller than that of the through-hole 9f. Further, the regulation member 90 is formed in a plane-symmetrical shape relative to a virtual plane passing the center of the regulation member 90 and perpendicular to the arrow K direction.

As shown in FIGS. 4 and 5, while the bottom wall 91a of the rectangular cylinder part 91 abuts on the bottom wall 9a of the lower case 9, and each circular cylinder part 92 is projected to an outside of the case 5 via the through-holes 9f of the regulation member attaching part 51, the regulation member 90 is fixed to the lower case 9 with the bolt 12 or the like, and interposed between the bottom wall 9a of the lower case 9 and the ceiling wall 10a of the upper case 10. Thus, in a condition that the regulation member 90 is attached to the case 5, and the case 5 is attached to the floor 2, the upper wall 91c of the rectangular cylinder part 91 abuts on the ceiling wall 10a, the bottom wall 91a of the rectangular cylinder part 91 abuts on the bottom wall 9a, the circular cylinder part 92 is projected out of the case 5 via the through-hole 9f, and a lower wall 92a of the circular cylinder part 92 abuts on the floor 2.

The regulation member 90 partitions the wire receiving space 41 into a first space 46 near the wire moving space 40, and a second space 47 away from the wire moving space 40. These first and second spaces 46, 47 are connected to each other at the other end 5b of the case 5. The corrugate tube 4 and a part of the electric wire 50 near the floor 2 side are received in the second space 47. The corrugate tube guided from the second space 47 via the other end 5n of the case 5, and a part of the electric wire 50 near the seat 3 are received in the first space 46. Namely, the regulation member 90 regulates the cabling route of the electric wire 50 in the case 5 in a U-shape by partitioning the case 5.

The rail 11 is made of a metal plate, and formed independently from the lower case 9. As shown in FIG. 4, the rail 11 is formed in a rectangular shape in a plan view of which longitudinal direction is parallel to the arrow K. Further, the rail 11 includes: a plate-shaped bottom plate part 11a; and a pair of hook walls 11b vertically extending from both edge in a width direction (perpendicular to the arrow K) of the bottom plate part 11a. The bottom plate part 11a is overlapped with a flat surface of the rail attaching part 9d, and fixed to the rail attaching part 9d by welding or the like. The pair of hook walls 11b is extended straight parallel to each other from both edges in the width direction of the bottom plate part 11a, then, extended in a direction approaching each other parallel to the bottom plate part 11a, thereby a cross section of the hook wall 11b is formed in a hook shape.

As shown in FIG. 4, the rail 11 is shifted from the slit 25 in a width direction of the rail 11. Further, the rail 11 and the rail attaching part 9d partition the inner space of the case 5 into the wire moving space 40 near the slit 25 and the wire receiving space 41 away from the slit 25. Further, a gap D between the rail 11 and an inner surface of the upper wall 10b of the upper case 10 is narrower than an outer diameter R of the corrugate tube 4.

Each of the mall brackets 8 is formed in a flat plate shape. These mall brackets 8 are arranged along the longitudinal direction of the mall attaching part 10d with gaps between them, and attached to a surface of the mall attaching part 10d. Further, a width of the mall bracket 8 perpendicular to the arrow K is wider than a width of the mall attaching part 10d, and both ends of the mall bracket 8 are disposed outside of both ends of the mall attaching part 10d. A later-described fixing part 20 of the mall 7a is attached to such a mall bracket 8.

The pair of malls 7a, 7b is made of synthetic resin, formed in a plate shape, and attached to the case 5 in a manner that longitudinal directions of the malls 7a, 7b are parallel to the arrow K. Further, the pair of malls 7a, 7b is arranged with a gap which is parallel to the surface of the floor 2 and perpendicular to the arrow K, and the slit 25 is positioned between the pair of malls 7a, 7b. A later-described wire receiving part 15 of the first protector 6 is inserted into the slit 25. Namely, the wire receiving part 15 is positioned between the pair of malls 7a, 7b.

Further, as shown in FIG. 4, the pair of malls 7a, 7b integrally includes: a flat-plate-shaped main body part 16 overlapped with the case 5; and an elastically deformable abutting piece 17 extending from the main body part 16 and abutting on the wire receiving part 15 of the first protector 6. The abutting pieces 17 of the pair of malls 7a, 7b cover a space between the inner edge 10f of the upper case 10 and the inner edge wall 9b of the lower case 9, namely, the slit 25 to prevent a foreign particle or the like from entering the space.

One mall 7a positioned at an outside of the cabin further includes the fixing part 20 to be attached to the mall bracket 8. This fixing part 20 includes: a pair of standing parts 26 standing from the main body part 16; and a pair of extending parts 27 extending from both edges of the standing parts 26 away from the main body part 16 in a direction approaching each other.

The pair of standing parts 26 is arranged along a width direction (perpendicular to the arrow k) of the mall bracket 8 with a gap between them, and extending from the main body part 16 toward the upper case 10 parallel to each other. The mall attaching part 10d and the mall bracket 8 are positioned between the pair of standing parts 26. The pair of extending parts 27 is extended from the above-described edges of the standing parts 26 along a surface of the upper wall 10b of the upper case 10. Further, the standing parts 26 and the extending parts 27 are extended straight along the arrow K.

As shown by a chain line in FIG. 2, when the mall 7a is slid on the upper case 10 along the arrow K, the extending parts 27 are positioned between the both ends of the mall bracket 8 and the upper case 10, and the both ends of the mall bracket 8 is positioned between the extending parts 27 and the main body part 16 sequentially from the mall bracket 8 positioned at one end of the arrow K of the upper case 10 to the mall bracket 8 positioned at the other end. Thus, the mall 7a is attached to the upper case 10, namely, the case 5. Further, the other mall 7b is attached to the inner edge wall 9b of the lower case 9 with a double-sided adhesive tape or the like.

The first protector 6 is made of synthetic resin, and as shown in FIGS. 1 and 4, includes: a sliding part 13, a tube fixing part 14, and a wire receiving part 15. The sliding part 13 is projected downward from the wire receiving part 15, received in the rail 11, and slidably supported in the longitudinal direction of the rail 11 by the rail 11. Namely, the first protector 6 is slidably provided along the longitudinal direction of the rail 11. The tube fixing part 14 fixes an end of the corrugate tube 4. The wire receiving part 15 is formed in a tubular shape, and one end of the wire receiving part 15 is continued to the tube fixing part 14. When the sliding part 13 is slidably supported by the rail 11, the other end of the wire receiving part 15 is projected toward the seat 3 from the case 5 via the slit 25. The electric wire 50 guided out from the end of the corrugate tube 4 is inserted into the wire receiving part 15, and guided from the case 5 to the seat 3. Further, a wire fixing part 15a for fixing the electric wire 50 is provided on the wire receiving part 15.

The second protector 30 is made of synthetic resin, and as shown in FIGS. 1 and 4, includes: a second wire receiving part 31 of which inside the electric wire 50 guided out from the wire receiving part 15 is positioned at; and a flange part 32 attached to the seat 3. A wire fixing part 31a for fixing the electric wire 50 is provided on the second wire receiving part 31.

A string 19 is tied between the first protector 6 and the flange part 32 of the second protector 30. Therefore, the first protector 6 is movably provided along the longitudinal direction of the rail 11, namely, the arrow K, and by pulling by the second protector 30, namely, the seat 3 with the string 19, the first protector 6 is movably provided in linkage with the seat 3 along the arrow K.

Further, an end of a mat 28 put on the floor 2 is pressed into between the mall 7a of the wire cabling device 1 and the upper case 10, namely, the case 5. Then, the end of the mat 28 is fixed to at least one of the mall 7a and the upper case 10.

As shown in FIG. 7, the wire cabling device 1 is attached to the floor 2, and provides the electric wire 50 to the seat 3 of an assistant driver side. Further, in a wire cabling device 1' providing the electric wire 50 to the seat 3 of a driver side, the case 5 and the regulation member 90 are designed in a line-symmetric shape along a width direction H of a vehicle with the wire cabling device 1. Namely, the case 5 of the wire cabling device 1' is the case 5 of the wire cabling device 1 rotated 180 degree in which the regulation member 90 is previously attached to the regulation member attaching part 52 of the case 5 of the wire cabling device 1 in FIG. 7. Thus, in the present invention, the case 5 of the wire cabling device 1 and the case 5 of the wire cabling device 1' are commonly used. Further, the regulation member 90, the corrugate tube 4, the pair of malls 7a, 7b, and the rail 11 are also commonly used.

When the wire cabling device 1 and the wire cabling device 1' are produced, firstly, the upper case 10 and the lower case 9 are produced by well-known roll forming, extrusion molding, or the like to provide an elongated structure having a constant sectional shape along a sliding direction of the seat 3, namely, a sliding direction of the first protector 6, by cutting the elongated structure in a specific length, and by punching holes for inserting the bolts 12 and punching six through-holes 9f. Then, the regulation member 90 produced independently from the case 5 is attached to either of the two regulation member attaching parts 51, 52 corresponding to whether a left side or a right side of a vehicle. Then, the other parts are attached to the lower case 9 corresponding to whether the left side or the light side of the vehicle, the upper case 10 is overlapped with the lower case 9, and fixed to the lower case 9 with the bolts 12, thereby the wire cabling device 1 and the wire cabling device 1' are produced.

In the present invention, because the regulation member 90 is formed independently from the case 5, the shape of the case 5 can be a tubular shape having a constant sectional shape along the sliding direction of the seat 3. Therefore, in a plurality of wire cabling devices 1, 1' respectively cabling electric wires to a plurality of seats 3 provided on the right and left sides of a vehicle, the case 5 can be commonly used. Further, these cases 5 can be made by roll forming or extrusion molding having high productivity. Resultingly, a cost of the wire cabling device 1, 1' can be reduced, and a production cost of the case 5 can be reduced.

Further, in the present invention, because regulation member attaching parts 51, 52 are provided on two places, one end 5a and the other end 5b of the case 5, in a plurality of wire cabling devices 1, 1', it is unnecessary to respectively provide the regulation member attaching parts 51, 52 to the cases 5 independently. Therefore, the production cost of the case 5 can be reduced.

Further, in the present invention, because the regulation member 90 is formed in a plane-symmetrical shape relative to a virtual plane passing the center of the regulation member 90 and perpendicular to the sliding direction of the seat 3, in a plurality of wire cabling devices 1, 1', not only the case 5 but also the regulation member 90 can be commonly used. Therefore, the cost of the wire cabling device 1, 1' can be further reduced.

Further, the wire cabling device 1, 1' is provided under the seat 3, and hidden under the mat 28 (see FIG. 4). Therefore, a crew member may stamp the wire cabling device 1, 1' in an arrow F direction of FIG. 4.

At this point, in the present invention, when a load is applied from the ceiling wall 10*a* toward the bottom wall 9*a* along the arrow F, the caps 60, 60' 70, 70' and the regulation member 90 work as supports and the load is not applied to the bottom wall 9*a*, and transmitted to the floor 2, thereby the stress generated in the case 5 is reduced. Therefore, the rigidity capable of sufficiently enduring the load can be attained using the case 5 and the pair of caps 60, 60', 70, 70' made by a process having high productivity such as roll forming or extrusion molding without providing a bead shape (namely, convexes and concaves made by press working) for increasing the rigidity which is provided in a conventional case by press working. Further, because a thickness of the case 5 can be reduced, the case 5 can be lighter, and a material cost can be reduced. Further, because the number of bolting positions for preventing the case 5 from being deformed by the load can be further reduced than the conventional case, design flexibility of the case 5 is increased, and man-hours for bolting the case 5 can be reduced.

Further, when convexes and concaves of which shapes depend on a car type are formed on a surface of the floor 2 to which the case 5 is attached, because the case 5 is disposed with a gap from the floor 2, it is unnecessary to design the bottom wall 9*a* of the case 5 in order to fit the convexes and the concaves, and only the bottom walls 61*d*, 64*c*, 163 of the cap 60, 60', 70, 70' are designed in order to fit the concaves and the convexes. Therefore, the case 5 can be commonly used in different car types.

Further, in the above-described embodiment, the case 5 is composed of two members, the lower case 9 and the upper case 10. However, in the present invention, the case 5 may be composed of one member.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A wire cabling device comprising:
a case configured to receive a middle part of an electric wire arranged between a vehicle body and a sliding object slidably mounted on the vehicle body, and configured to be attached to the vehicle body, the case defining an interior and having a first end forming an opening for receiving the middle part of the electric wire,
a slider capable of moving in linkage with the sliding object on a rail attached to the case while holding the electric wire,
a regulation member which is provided in the interior of the case adjacent the first end and regulates a cabling route of the electric wire in the case by partitioning the case, wherein:
the case is formed in a tubular shape having a constant sectional shape along a sliding direction of the sliding object;
the regulation member is formed independently from the case,
the regulation member is attached to the case so that the regulation member is stationary in a single place, and the regulation member extends from the first end of the case approximately to a center of the case parallel to the sliding direction with a first portion of the middle part of the electric wire arranged along an entire length of the regulation member and the electric wire is U-turned where the regulation member is not provided in the case;
the regulation member includes a plurality of regulation member attaching parts that project outward from a bottom wall of the regulation member in a direction perpendicular the sliding direction and are inserted into through-holes respectively in a bottom wall of a lower case of the case to fixedly hold the regulation member in place in the case; and
the case includes a plurality of the through-holes in various locations so that the regulation member may be mounted in a plurality of locations.

2. The wire cabling device as claimed in claim 1, wherein regulation member attaching parts capable of attaching the regulation member are provided on two places, one end and the other end of the case in the sliding direction.

3. The wire cabling device as claimed in claim 2, wherein the regulation member is formed in a plane-symmetrical shape relative to a virtual plane passing the center of the regulation member and perpendicular to the sliding direction.

4. The wire cabling device as claimed in claim 3, wherein the case includes: a bottom wall having a gap with the vehicle body; and a ceiling wall facing the bottom wall, and
wherein the case further includes a pair of caps respectively attached to both ends of the case, said caps having a ceiling wall abutting part abutting on an inner surface at the bottom wall side of the ceiling wall, and a vehicle body abutting part abutting on the vehicle body.

5. The wire cabling device as claimed in claim 2, wherein the case includes: a bottom wall having a gap with the vehicle body; and a ceiling wall facing the bottom wall, and
wherein the case further includes a pair of caps respectively attached to both ends of the case, said caps having a ceiling wall abutting part abutting on an inner surface at the bottom wall side of the ceiling wall, and a vehicle body abutting part abutting on the vehicle body.

6. The wire cabling device as claimed in claim 1, wherein the regulation member is formed in a plane-symmetrical shape relative to a virtual plane passing the center of the regulation member and perpendicular to the sliding direction.

7. The wire cabling device as claimed in claim 6, wherein the case includes: a bottom wall having a gap with the vehicle body; and a ceiling wall facing the bottom wall, and wherein the case further includes a pair of caps respectively attached to both ends of the case, said caps having a ceiling wall abutting part abutting on an inner surface at the bottom wall side of the ceiling wall, and a vehicle body abutting part abutting on the vehicle body.

8. The wire cabling device as claimed in claim 1, wherein the case includes: a bottom wall having a gap with the vehicle body; and a ceiling wall facing the bottom wall, and
wherein the case further includes a pair of caps respectively attached to both ends of the case, said caps having a ceiling wall abutting part abutting on an inner surface at the bottom wall side of the ceiling wall, and a vehicle body abutting part abutting on the vehicle body.

9. The wire cabling device as claimed in claim 1, wherein the regulation member makes the electric wire turn in the U-shape at a position where the regulation member is not provided.

10. The wire cabling device as claimed in claim 1, wherein the regulation member divides the cabling route of the electric wire in the case in to a portion fixed to one outer side wall of the regulation member, a portion turned in the U-shape, and a portion extended along another side wall of the regulation member by partitioning the case.

11. The wire cabling device as claimed in claim 1, wherein the case is elongated along the sliding direction, and a height of the regulation member is approximately equal to a height of the case.

12. The wire cabling device as claimed in claim 1, further comprising wire fixing parts coupling the wire to the regulation member so that the wire forms a U-shape within the case.

13. A method for manufacturing a wire cabling device including: a case for receiving an electric wire; a slider capable of moving on a rail attached to the case while holding the electric wire; and a rectangular cylindrical regulation member provided in the case and that regulates a cabling route of the electric wire in the case by partitioning the case, said method comprising the steps of:

forming the case in a tubular shape having a constant sectional shape along a sliding direction of the slider so that the case defines an interior;

producing the regulation member independent from the case; and attaching the regulation member to the case at an attaching position properly changeable along the sliding direction, wherein:

the regulating member produced independent from the case is attached to the case, to be fixed in place, and the regulation member extends from the first end of the case approximately to a center of the case parallel to the sliding direction with a first portion of the middle part of the electric wire arranged along an entire length of the regulation member and the electric wire is U-turned where the regulation member is not provided in the case;

the regulation member includes a plurality of regulation member attaching parts that project outward from a bottom wall of the regulation member in a direction perpendicular the sliding direction and are inserted into through-holes respectively in a bottom wall of a lower case of the case to fixedly hold the regulation member in place in the case; and the case includes a plurality of the through-holes in various locations so that the regulation member may be mounted in a plurality of locations.

* * * * *